US012172270B2

(12) United States Patent
Kukucka et al.

(10) Patent No.: US 12,172,270 B2
(45) Date of Patent: Dec. 24, 2024

(54) ADVANCED HOLDING APPARATUS

(71) Applicant: GRIP HOLDINGS LLC, Brandon, FL (US)

(72) Inventors: Paul Kukucka, Brandon, FL (US); Thomas Stefan Kukucka, Brandon, FL (US)

(73) Assignee: GRIP HOLDINGS LLC, Brandon, FL (US)

( * ) Notice: Subject to any disclaimer, the term of this patent is extended or adjusted under 35 U.S.C. 154(b) by 28 days.

(21) Appl. No.: 17/224,032

(22) Filed: Apr. 6, 2021

(65) Prior Publication Data

US 2021/0220977 A1 Jul. 22, 2021

Related U.S. Application Data

(63) Continuation-in-part of application No. 16/942,658, filed on Jul. 29, 2020, now Pat. No. 10,967,488, which is a continuation-in-part of application No. PCT/IB2019/056500, filed on Jul. 30, 2019, and a continuation-in-part of application No. 16/107,842, filed on Aug. 21, 2018, now Pat. No. 10,780,556.

(51) Int. Cl.

| | |
|---|---|
| ***B25B 23/10*** | (2006.01) |
| ***B25B 15/00*** | (2006.01) |
| ***B25B 23/00*** | (2006.01) |

(52) U.S. Cl.

CPC .......... *B25B 23/108* (2013.01); *B25B 15/008* (2013.01); *B25B 23/0035* (2013.01); *B25B 15/005* (2013.01)

(58) Field of Classification Search

CPC ................ B25B 15/001; B25B 15/004; B25B 15/005; B25B 15/008; B25B 23/103; B25B 23/105; B25B 23/108; F16B 23/003; F16B 23/0038

USPC ..................... 81/439, 461, 179, 177.75, 53.2

See application file for complete search history.

(56) References Cited

U.S. PATENT DOCUMENTS

| | | | |
|---|---|---|---|
| 1,798,944 | A | 3/1931 | Jackman |
| 5,031,487 | A | 7/1991 | Corp |
| 5,868,049 | A | 2/1999 | Kanwai |
| 5,873,290 | A | 2/1999 | Chaconas |

(Continued)

FOREIGN PATENT DOCUMENTS

| | | | |
|---|---|---|---|
| CN | 101208181 | A | 6/2008 |
| CN | 204186727 | U | 3/2015 |

(Continued)

*Primary Examiner* — Robert F Neibaur

(57) ABSTRACT

A screw bit body which allows for efficient torque force application onto a socket fastener. The screw bit body includes a plurality of laterally-bracing sidewalls, a first base, and a second base. The laterally-bracing sidewalls are radially distributed about a rotation axis of the screw bit body with each further including a first lateral edge, a second lateral edge, a bracing surface, and an engagement cavity. The engagement cavity creates an additional gripping point to prevent slippage in between the screw bit body and the socket fastener. The engagement cavity traverses normal and into the bracing surface. Additionally, the engagement cavity traverses into the screw bit body from the first base to the second base. The engagement cavity is specifically positioned offset from the first lateral edge by a first distance.

3 Claims, 17 Drawing Sheets

(56) References Cited

U.S. PATENT DOCUMENTS

| | | | |
|---|---|---|---|
| 6,092,279 A | 7/2000 | Shoup | |
| 6,352,011 B1 | 3/2002 | Frühm | |
| 8,302,255 B2 * | 11/2012 | Lin | B25B 15/008 81/436 |
| 2002/0184976 A1 * | 12/2002 | Mizuno | B25B 15/005 81/121.1 |
| 2006/0266168 A1 | 11/2006 | Pacheco | |
| 2007/0005070 A1 | 1/2007 | Kay et al. | |
| 2010/0064863 A1 | 3/2010 | Kozak | |
| 2012/0210826 A1 | 8/2012 | Stawarski | |
| 2013/0047798 A1 * | 2/2013 | Huang | B25B 13/481 81/461 |
| 2013/0213193 A1 | 8/2013 | Lukes | |
| 2013/0263706 A1 | 10/2013 | Safar | |
| 2015/0314429 A1 | 11/2015 | Doroslovac | |
| 2015/0335368 A1 * | 11/2015 | Auger | B25B 15/004 81/436 |
| 2016/0046008 A1 | 2/2016 | Thomas | |
| 2017/0246733 A1 | 8/2017 | Shehab | |
| 2017/0312897 A1 | 11/2017 | Doroslovac | |
| 2018/0001450 A1 | 1/2018 | Anderson | |
| 2018/0354102 A1 | 12/2018 | Kukucka | |
| 2020/0039034 A1 | 2/2020 | Kukucka | |
| 2020/0298380 A1 | 9/2020 | Doroslovac et al. | |

FOREIGN PATENT DOCUMENTS

| | | | |
|---|---|---|---|
| CN | 104675820 | A | 6/2015 |
| EP | 0930132 | A2 | 7/1999 |
| EP | 0930132 | A3 | 11/2000 |
| EP | 1371453 | A2 | 12/2003 |
| EP | 2363245 | | 9/2011 |
| JP | H06-15580 | | 1/1994 |
| JP | H0737805 | | 4/1995 |
| JP | 2014100742 | | 6/2014 |
| JP | 2017042898 | A | 3/2017 |
| JP | 2020128007 | | 8/2020 |
| TW | 201813785 | A | 4/2018 |
| TW | 201829135 | A | 8/2018 |
| WO | 9416862 | A | 8/1994 |
| WO | WO9812982 | A1 | 4/1998 |
| WO | 2006130490 | A | 12/2006 |
| WO | 2015013246 | A | 1/2015 |
| WO | WO2015050942 | A1 | 4/2015 |
| WO | 2015082283 | | 6/2015 |
| WO | 2016005180 | A | 1/2016 |
| WO | WO2017069953 | A1 | 4/2017 |

* cited by examiner

ADVANCED HOLDING APPARATUS

The current application is a continuation-in-part (CIP) application of the U.S. non-provisional application Ser. No. 16/942,658 filed on Jul. 29, 2020. The U.S. non-provisional application Ser. No. 16/942,658 is a CIP application of the U.S. non-provisional application Ser. No. 16/107,842 filed on Aug. 21, 2018. The U.S. non-provisional application Ser. No. 16/942,658 is also a CIP application of the Patent Cooperation Treaty (PCT) application PCT/IB2019/056500 filed on Jul. 30, 2019.

FIELD OF THE INVENTION

The present invention generally relates to various tools designed for tightening or loosening fasteners, in particular bolts and nuts. More specifically, the present invention is an anti-slip multidirectional driver bit, designed to prevent damaging or stripping fasteners during the extraction or tightening process.

BACKGROUND OF THE INVENTION

Hex bolts, nuts, screws, and other similar threaded devices are used to secure and hold multiple components together by being engaged to a complimentary thread, known as a female thread. The general structure of these types of fasteners is a cylindrical shaft with an external thread and a head at one end of the shaft. The external thread engages a complimentary female thread tapped into a hole or a nut and secures the fastener in place, fastening the associated components together. The head receives an external torque force and is the means by which the fastener is turned, or driven, into the female threading. The head is shaped specifically to allow an external tool like a wrench to apply a torque to the fastener in order to rotate the fastener and engage the complimentary female threading to a certain degree. This type of fastener is simple, extremely effective, cheap, and highly popular in modern construction.

One of the most common problems in using these types of fasteners, whether male or female, is the tool slipping in the head portion, or slipping on the head portion. This is generally caused by either a worn fastener or tool, corrosion, overtightening, or damage to the head portion of the fastener. The present invention is a driving bit design that virtually eliminates slippage. The design uses a series of segmented portions that bite into the head of the fastener and allow for efficient torque transfer between the driving bit and the head portion of the fastener. The present invention eliminates the need for the common bolt extractors as they require unnecessary drilling and tools. With the development of electric screwdrivers, and drills, people have been using, power tools to apply the required torsional forces and remove various fasteners. The present invention provides a double-sided driver end bit, thus allowing for torque to applied to the fastener in both clockwise and counterclockwise directions, thus tightening or loosening the fastener. Most driver end bits have a standardized one fourth inch hex holder and come in various configurations including but not limited to, square end, hex end, or star end.

DETAIL DESCRIPTIONS OF THE INVENTION

All illustrations of the drawings are for the purpose of describing selected versions of the present invention and are not intended to limit the scope of the present invention.

The present invention generally related to torque tool accessories. More specifically, the present invention is a multi-grip screw bit, also known as a screw bit or driver. The present invention allows for a higher torque to be applied to a fastener than a similarly sized conventional driver bit without damaging the head of the fastener or the bit tool. This is achieved through the use of a multitude of engagement features which effectively grip the head of the fastener. The present invention is a screw bit that is compatible with a variety of torque tools including, but not limited to, traditional drills, bit-receiving screwdrivers, socket wrenches, and socket drivers.

Figure 1:
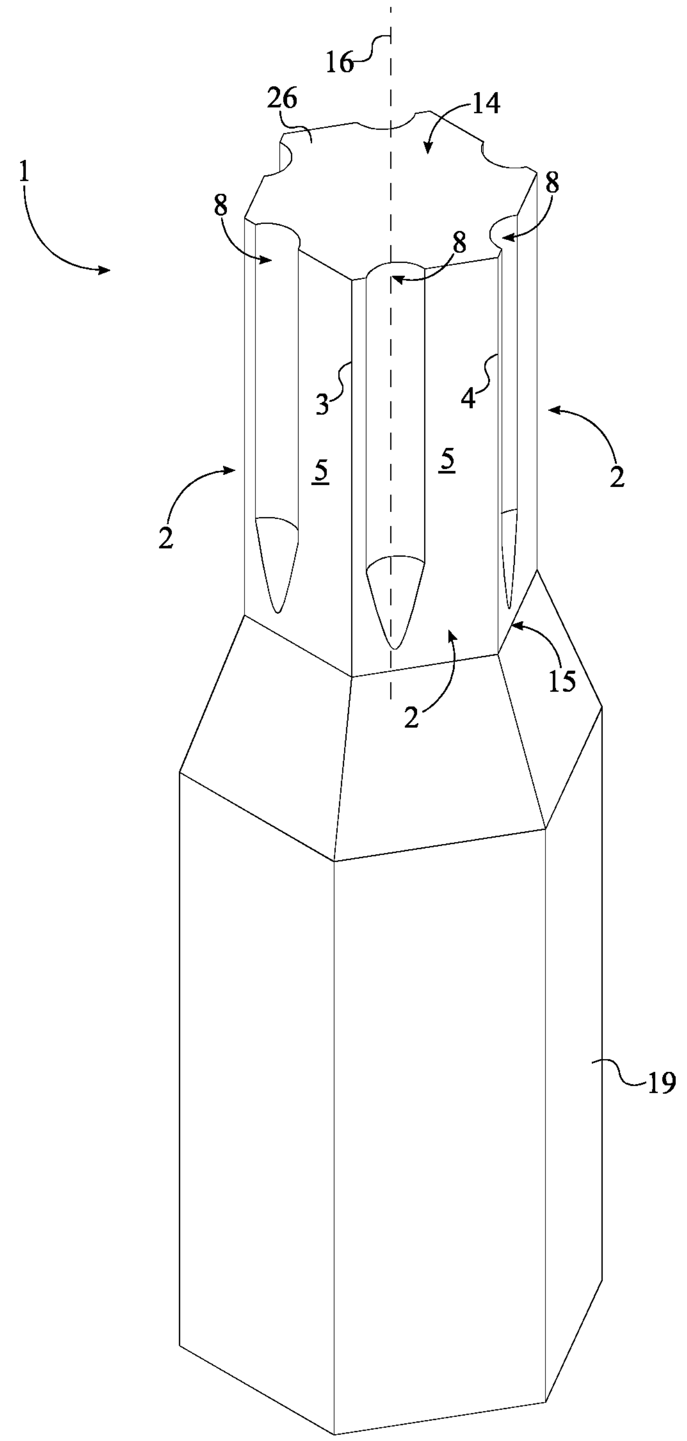
FIG. 1 is a perspective view of the present invention.

In its simplest embodiment, referring to FIG. 1, the present invention comprises an at least one screw bit body 1 and an attachment body 19. The screw bit body 1 is a shank which engages the socket fastener, such as a socket screw or a socket bolt, in order to apply a torque force onto the socket faster. The screw bit body 1 comprises a plurality of laterally-bracing sidewalls 2, a first base 14, and a second base 15. In general, the screw bit body 1 is a prism composed of a strong metal. Each of the plurality of laterally-bracing sidewalls 2 engage within and grip the socket fastener in order to efficiently transfer torque from a torque tool to the socket fastener. The first base 14 and the second base 15 are positioned opposite to each other along the plurality of laterally-bracing sidewalls 2. Additionally, the first base 14, and thus second base 15, is preferably oriented perpendicular to each of the plurality of laterally-bracing sidewalls and thus enclose/complete the prism shape of the screw bit body 1. More specifically, it is preferred that the first base 14 comprises a first base surface 26, wherein the first base surface 26 is flat and is oriented perpendicular to the bracing surface 5 of each of the plurality of laterally-bracing sidewalls 2. The bracing surface 5 may further comprise a first portion 33. The first portion 33 is a section of the bracing surface 5 positioned along a first distance 21, which arranges the first portion 33 adjacent to the first lateral edge 3. The attachment body 19 allows the present invention to be attached to an external torque tool and, thus, allow torque force to be applied to the socket fastener through the screw bit body 1. The attachment body 19 is centrally positioned around and along a rotation axis 16 of the screw bit body 1 such that the rotation axis of the attachment body 19 and the rotation axis 16 of the screw bit body 1 are coincidentally aligned. Additionally, the attachment body 19 is connected adjacent to the second base 15. The attachment body 19 preferably has a hexagonal cross-section in order to fit within a female attachment member of the external torque tool. External torque tools include, but are not limited to, electric drills, torque wrenches, pneumatic drills, socket screw drivers, and other similar torque tools. The engagement cavity 8 preferably combines a curved portion with a straight portion but can alternatively be any shape as preferred by the user, including, but not limited to, a triangular or rectangular shape. Additionally, the shape of each portion of the engagement cavity 8 can be a shape from a group consisting of, straight line, and or concave, and or convex if preferred. The combination or singular use of these shapes could further improve the longevity, safety, and functionality of the present invention in certain applications as determined by the user. In an exemplary embodiment, the entire cross-section 9 of the at least one engagement cavity 8 is a triangular profile. This arrangement provides ample space while applying torque for relief of residual stresses and material that would otherwise strain the at least one engagement cavity 8. Furthermore, the triangular profile may be concave along a direction from the first lateral edge 3 to the second lateral edge 4. In this way, torqueing stresses are captured within the at least one engagement cavity 8 during the application of torsion. In another exemplary embodiment, the at least one engagement cavity 8 contains both curved and straight portions. This arrangement allows the at least one engagement cavity 8 to interact optimally with different materials or different levels of stress during use.

Figure 9:
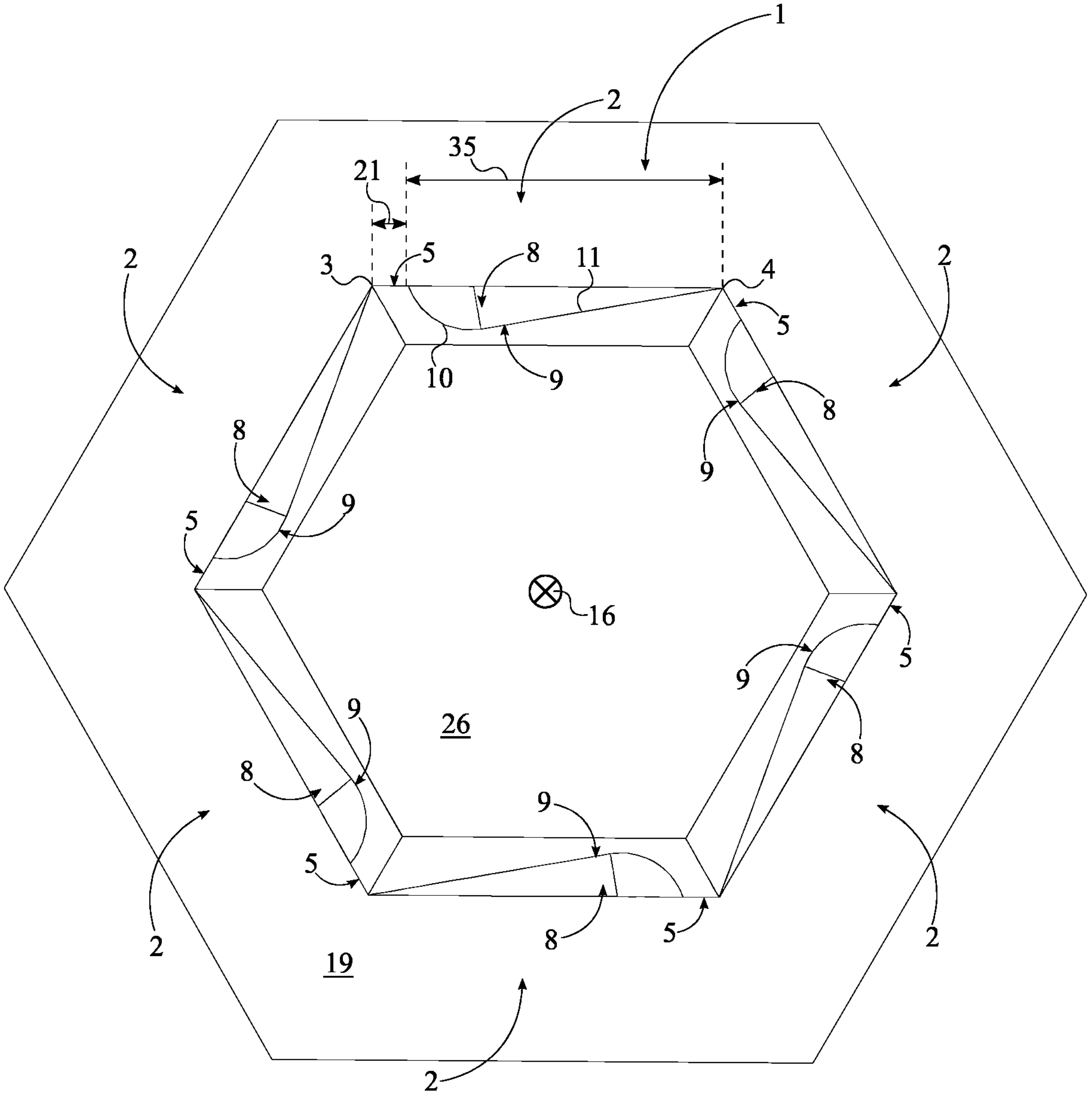
FIG. 9 is a front view of the alternative embodiment of the present invention in FIG. 8.

Some embodiments are generally more advantageous for leverage and resistance of mechanical wear during use. To this end, the at least one engagement cavity 8 is positioned offset from the first lateral edge 3 by a first distance 21, as shown in FIG. 9. Resultantly, a gripping point is created by the at least one engagement cavity 8 and the bracing surface 5. The first portion 33 may be positioned along the first distance 21. In this way, the first distance 21 may denote area including a segment of the first portion 33. A width distance 35 of the at least one engagement cavity 8 may be positioned parallel to the bracing surface 5. This arrangement allows the width distance 35 to be parallel to the first distance 21. The width distance 35 may be greater than the first distance 21. In this way, the at least one engagement cavity 8 is ensured to span across a significant portion of the useful area for the bracing surface 5.

The first portion 33 of the present invention may take a variety of shapes as may be found to be advantageous under various stresses or use cases. To ensure an appropriate shape of the at least one engagement cavity 8, the first portion 33 may be a shape selected from the group consisting of: straight line, concave, and convex, as shown in FIG. 14 through 17. Any of these shapes could provide optimal support during use, improving the duration of the present invention.

The bracing surface 5 may further benefit from a more complex shape or arrangement. To enable this, the bracing surface 5 may further comprise a second portion 34, as shown in FIG. 14 through 17. The second portion 33 is a section of the bracing surface 5 positioned along a second distance 22, which arranges the second portion 34 adjacent to the second lateral edge 4. The at least one engagement cavity 8 may be positioned offset from the second lateral edge 4 by a second distance 22. The second distance 22 denotes the space opposite the first distance 21 between the at least one engagement cavity 8 and the second lateral edge 4. The second portion 34 is positioned along the second distance 22. In this way, the second distance 22 may denote area including a segment of the second portion 34. The second portion 34 may be a shape selected from the group consisting of: straight line, concave, and convex. In this way, the second portion 34 may be adapted to best address potential mechanical fatigue to the present invention. Furthermore, the at least one engagement cavity 8 may taper perpendicular to a rotational axis, from a position adjacent to the first distance 21 or the second distance 22 towards a lateral edge. This arrangement allows for optimal application of force during rotational usage of the present invention. A bracing surface geometric plane positioned along the bracing surface 5, adjacent to the at least one engagement cavity 8, is preferably colinear with a lateral edge geometric plane that extends from the first lateral edge 3 to second lateral edge 4; however, in some embodiments, the bracing surface geometric plane may be offset from, rather than colinear with, the lateral edge geometric plane.

Figure 15:
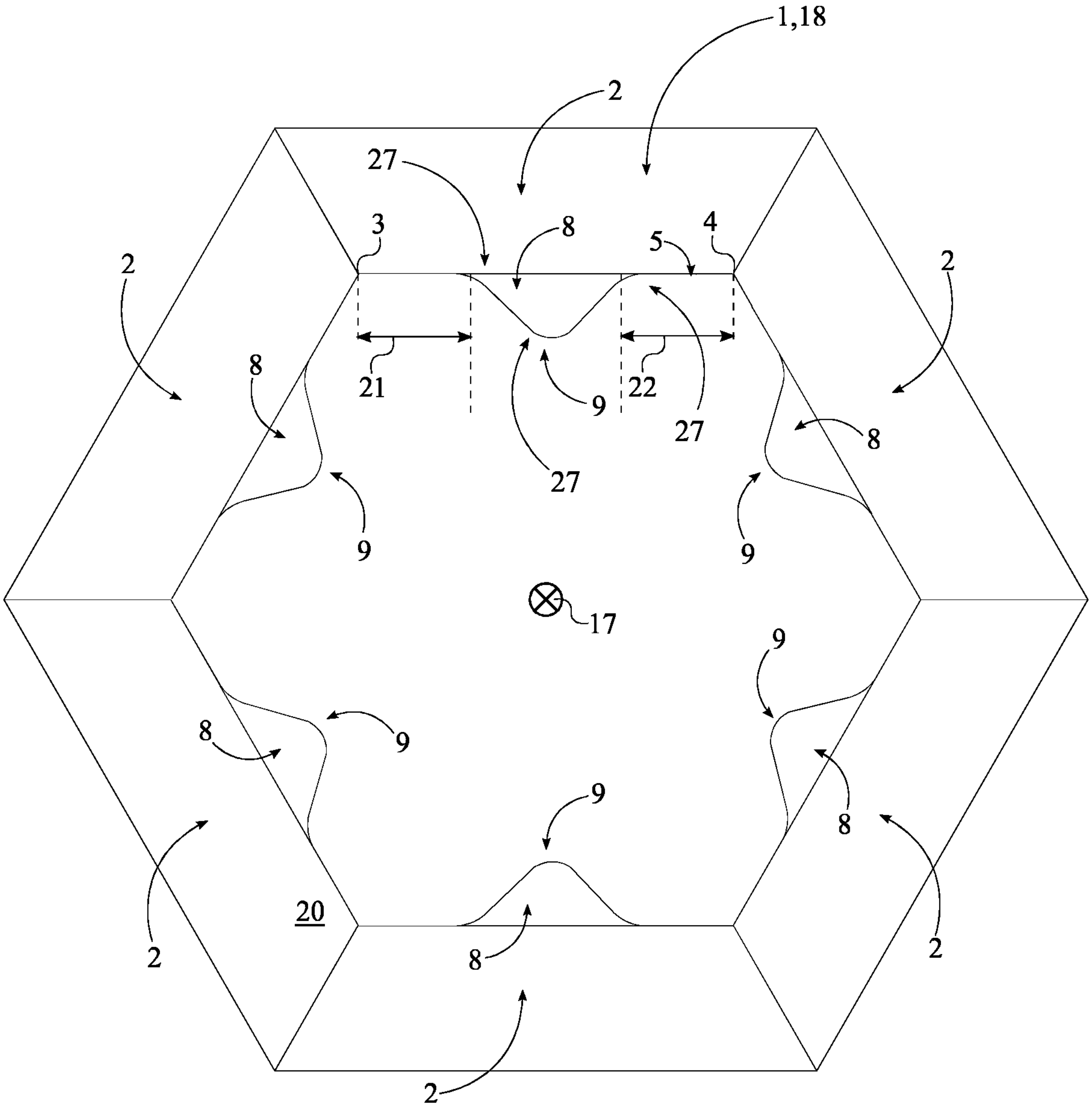
FIG. 15 is a front view of another separate alternative embodiment of the present invention in relation to FIG. 2, wherein an entire cross-section of the engagement cavity as a triangular profile.

The triangular profile may further comprise a plurality of vertexes 27, as represented in FIG. 15. The plurality of vertexes 27 relates to the locus of points representing corners of the triangular profile. Each of the plurality of vertexes 27 may be a rounded corner. This arrangement prevents point stresses from building at the plurality of vertexes 27 without significantly reducing the space required for effective mitigation of fatigue effects.

Figure 16:
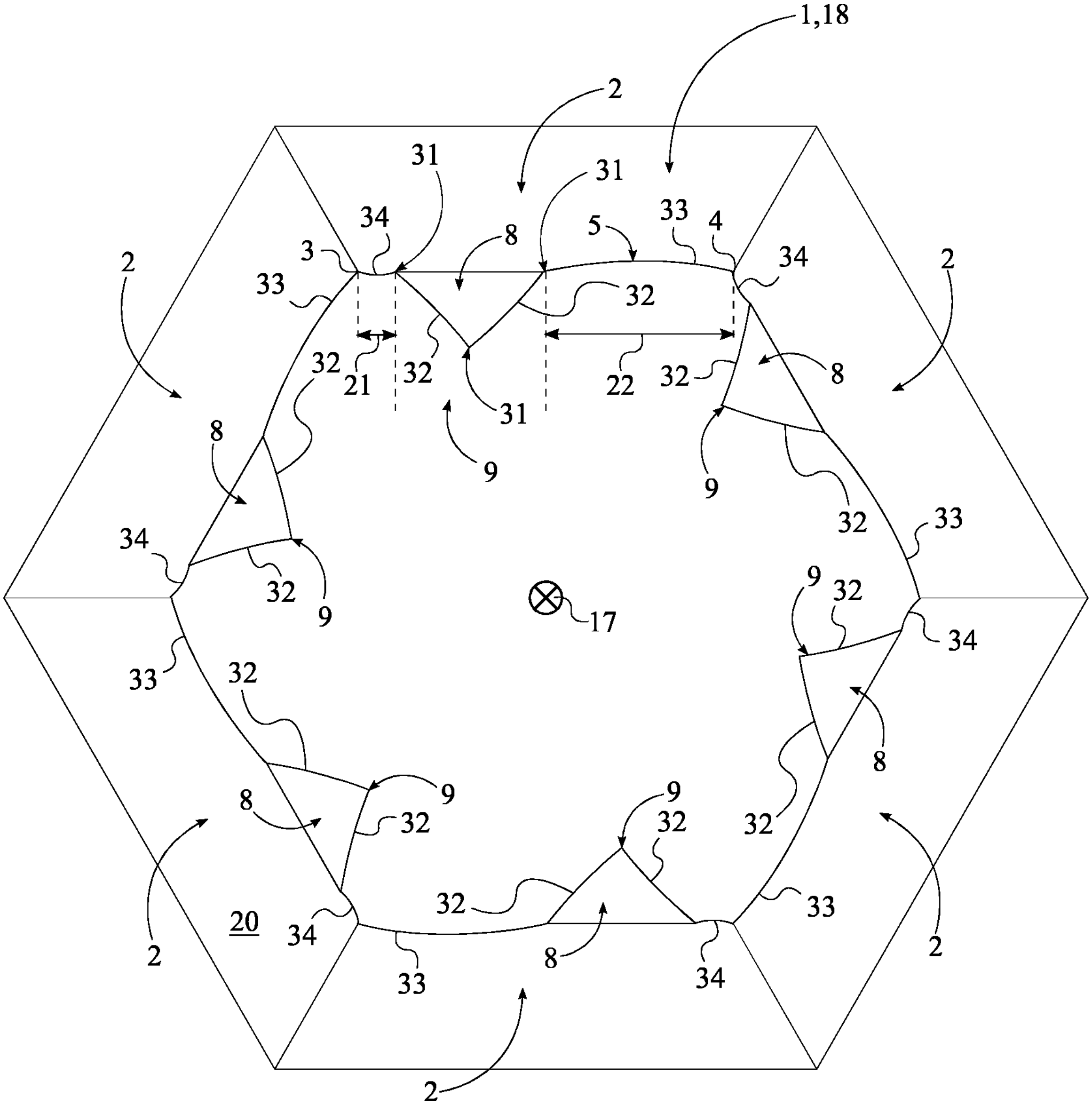
FIG. 16 is a front view of another separate alternative embodiment of the present invention in relation to FIG. 15, wherein different portions of a laterally-bracing sidewall are either concave or convex.
Figure 17:
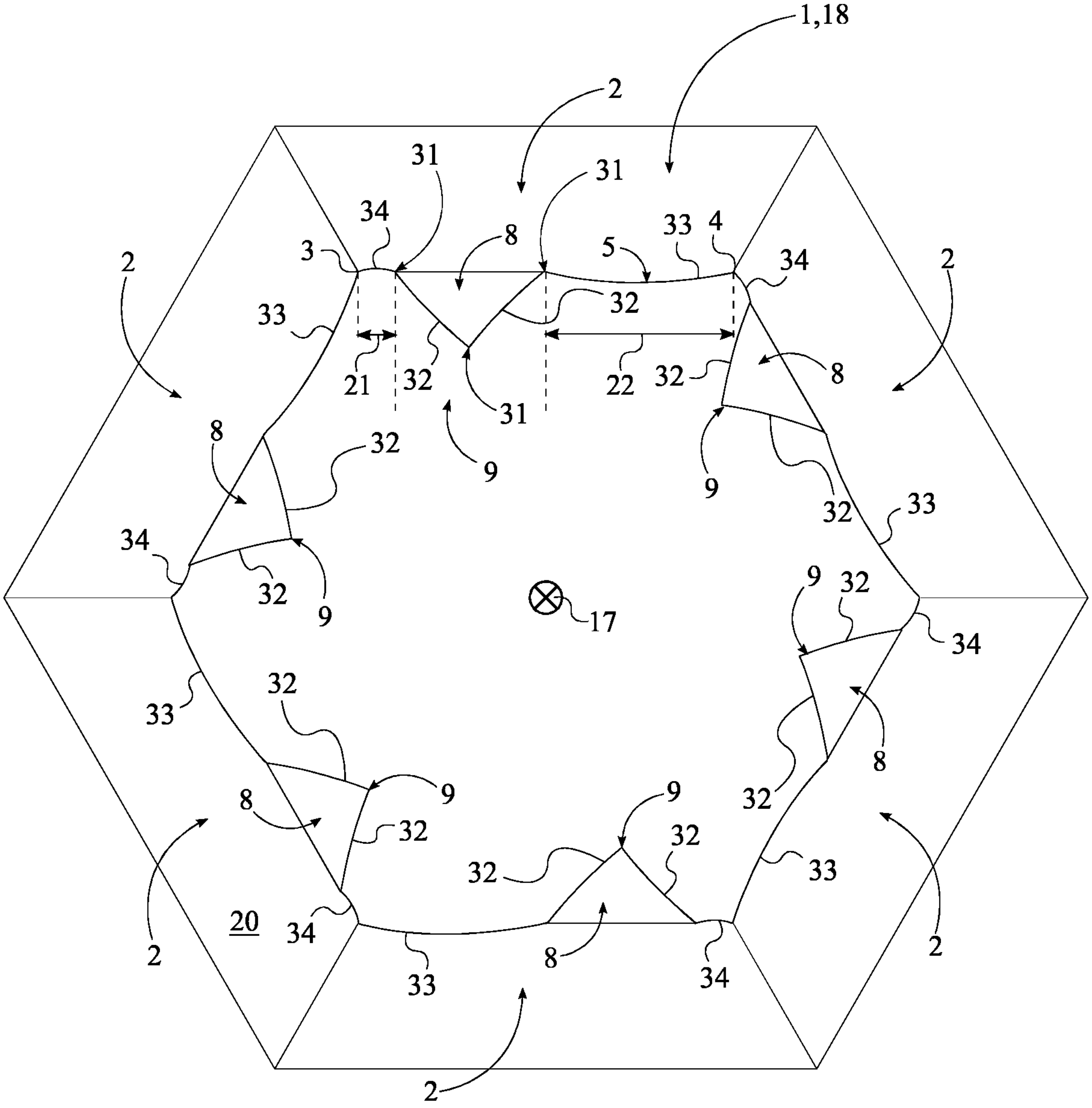
FIG. 17 is a front view of another separate alternative embodiment of the present invention in relation to FIG. 15, wherein different portions of a laterally-bracing sidewall are either convex or concave.

In many cases, it may be advantageous to allow for slight modifications to a strictly triangular profile, depending upon the intensity of torqueing stresses and the shape of the bolt or fixture. To enhance efficiency in such situations, the triangular profile may comprise a plurality of vertexes 31 and a pair of elongated portions 32, as shown in FIGS. 16 and 17. The plurality of vertexes 31 relates to a set of points representing the corners of the triangular profile. The plurality of vertexes 31 may be viewed as two leading edge elements along the first lateral edge 3 and the second lateral edge 4 and one cavity base element. The one cavity base element may also be a straight line connected to the pair of elongated portions 32. The pair of elongated portions 32 denotes the edges which join the plurality of vertexes 31 together. The pair of elongated portions 32 is interspersed amongst the plurality of vertexes 31. Thus, the pair of elongated portions 32 connects each of the plurality of vertexes 31 together. Each of the pair of elongated portions 32 is a shape selected from the group consisting of: straight line, concave, and convex. The group of shapes that may be selected for the plurality of vertexes 31, the pair of elongated portions 32, or the one cavity base element may be a radius or angular shape. This arrangement enables the pair of elongated portions 32 to better adapt to different torqueing stresses, thus preventing detrimental wear upon the used bit due to fatigue.

Other uses may call for modifications to the shape of the edges surrounding the triangular profile together. To provide for this, a bracing surface 5 comprises a first portion 33 and a second portion 34, as shown in FIGS. 16 and 17. The first portion 33 and the second portion 34 relate to the edges surrounding the triangular profile. The first portion 33 is positioned along a first distance 21, which arranges the first portion 33 adjacent to the first lateral edge 3. In addition, the second portion 34 is positioned along a second distance 22, which arranges the second portion 34 adjacent to the second lateral edge 4. The group of shapes that may be selected for the first portion 33 and the second portion 34, as shown in FIGS. 16 and 17, may be a radius or angular shape. It is often most advantageous for the first portion 33 and the second portion 34 to display opposite curvatures, with one being concave and the other being convex, for optimal reduction of cyclical stress-based effects on the present invention. Additional modifications may be implemented to the first lateral edge 3 and the second lateral edge 4 to form lateral edges which are angular or radial in shape.

Figure 3:
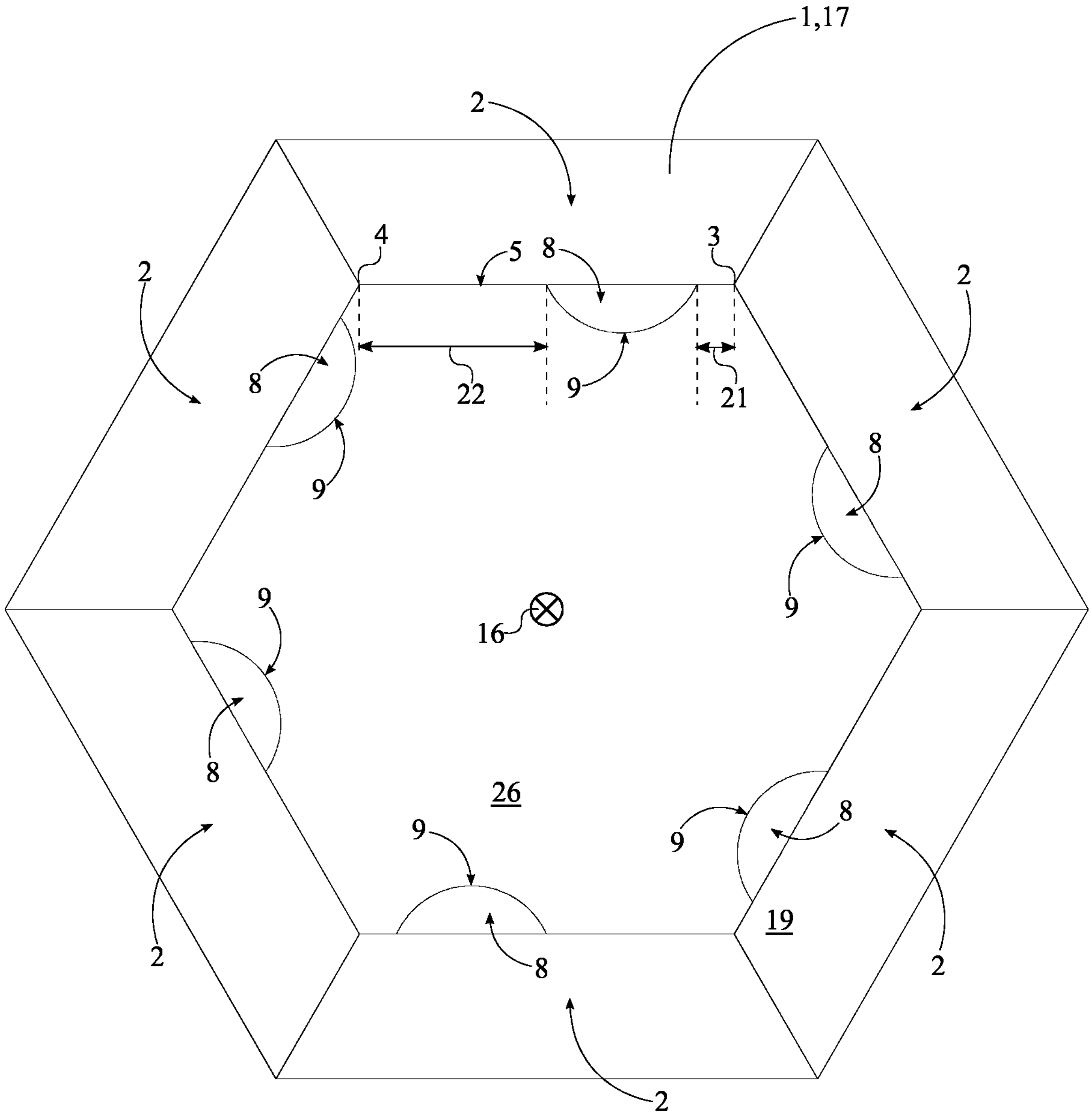
FIG. 3 is a front view of the alternative embodiment of the present invention in FIG. 2.
Figure 4:
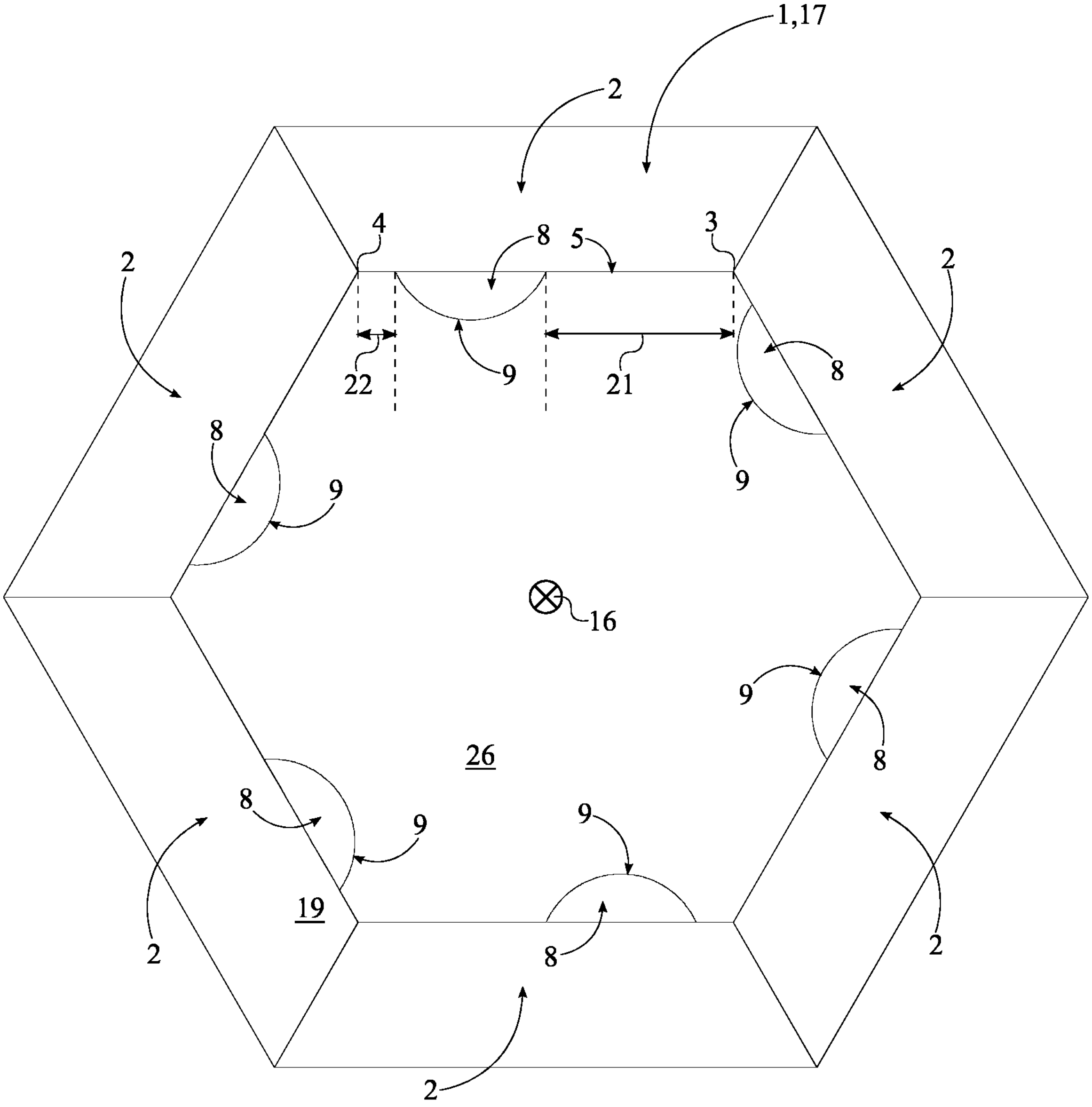
FIG. 4 is a rear view of the alternative embodiment of the present invention in FIG. 2.

Referring to FIG. 3 and FIG. 4, each of the plurality of laterally-bracing sidewalls 2 comprises a first lateral edge 3, a second lateral edge 4, a bracing surface 5, and an at least one engagement cavity 8. The plurality of laterally-bracing sidewalls 2 is radially positioned about the rotation axis 16 of the screw bit body 1 in order to yield a geometric profile complimentary to that of the socket fastener. The number within the plurality of laterally-bracing sidewalls 2 is subject to change to compliment the shape and profile of a variety of socket fasteners. In one embodiment of the present invention, the number within the plurality of laterally-bracing sidewalls 2 is six and the resulting geometric profile of the screw bit body 1 is a hexagon. In an alternative embodiment of the present invention, the number within the plurality of laterally-bracing sidewalls 2 is four.

Figure 11:
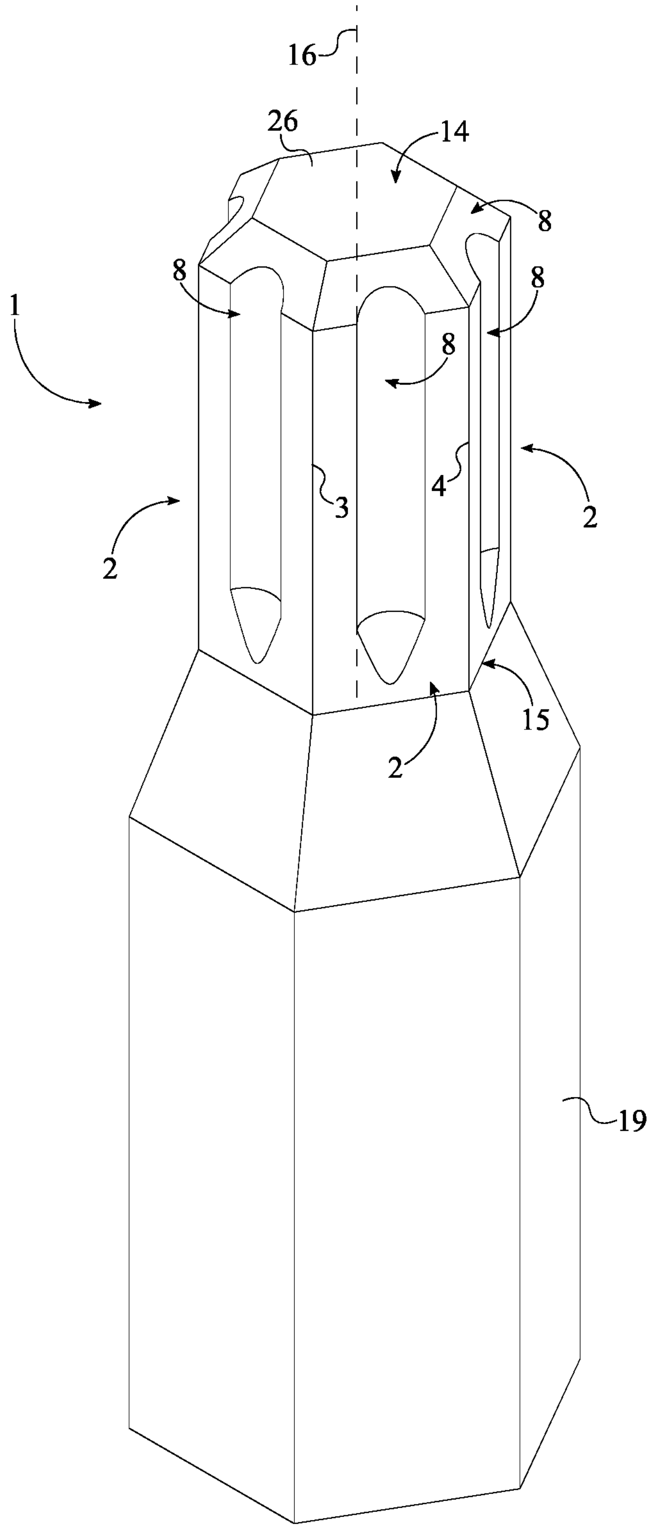
FIG. 11 is a perspective view of an alternative embodiment of the present invention.
Figure 13:
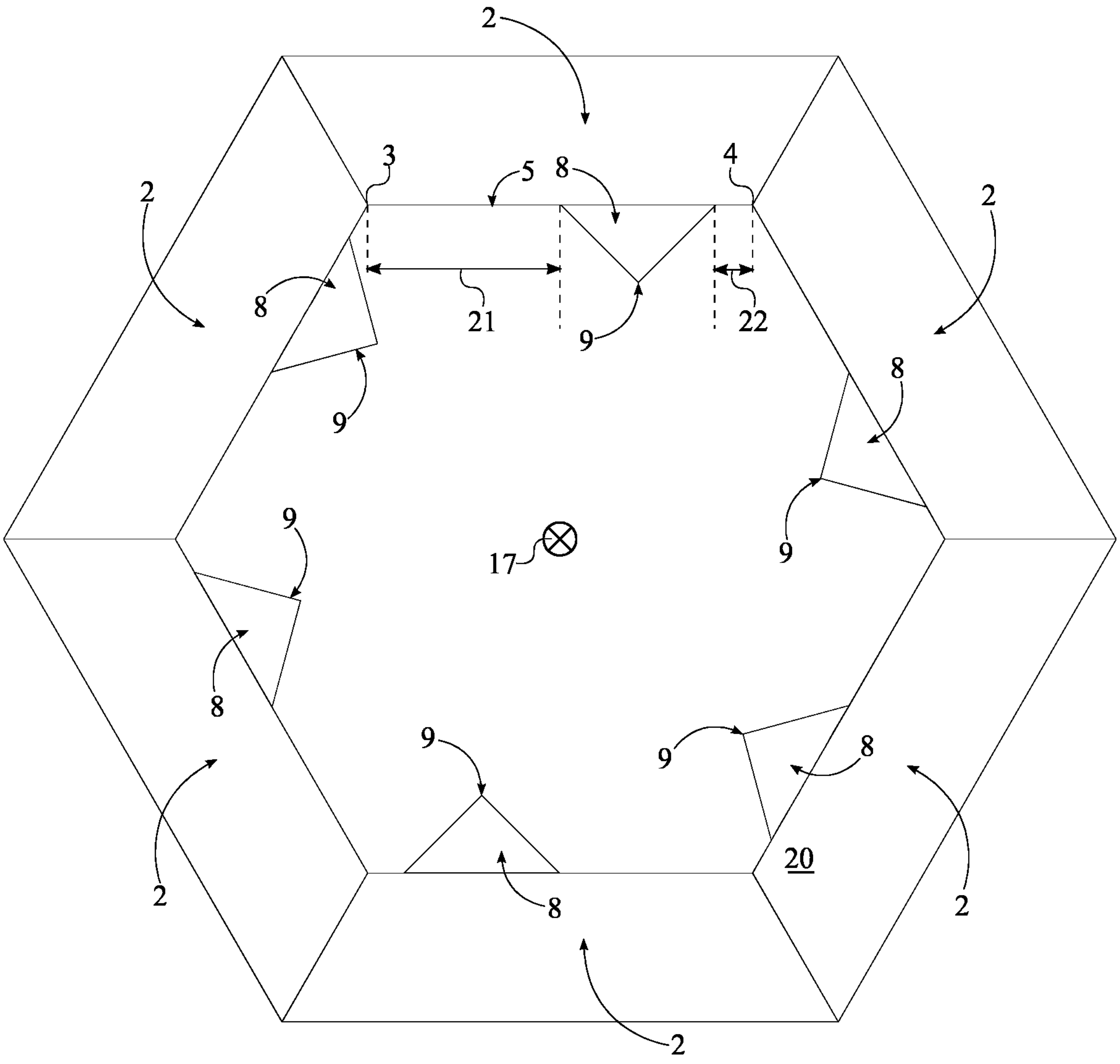
FIG. 13 is a front view of a separate alternative embodiment of the present invention in relation to FIG. 2, wherein an entire cross-section of the engagement cavity as a triangular profile.
Figure 14:
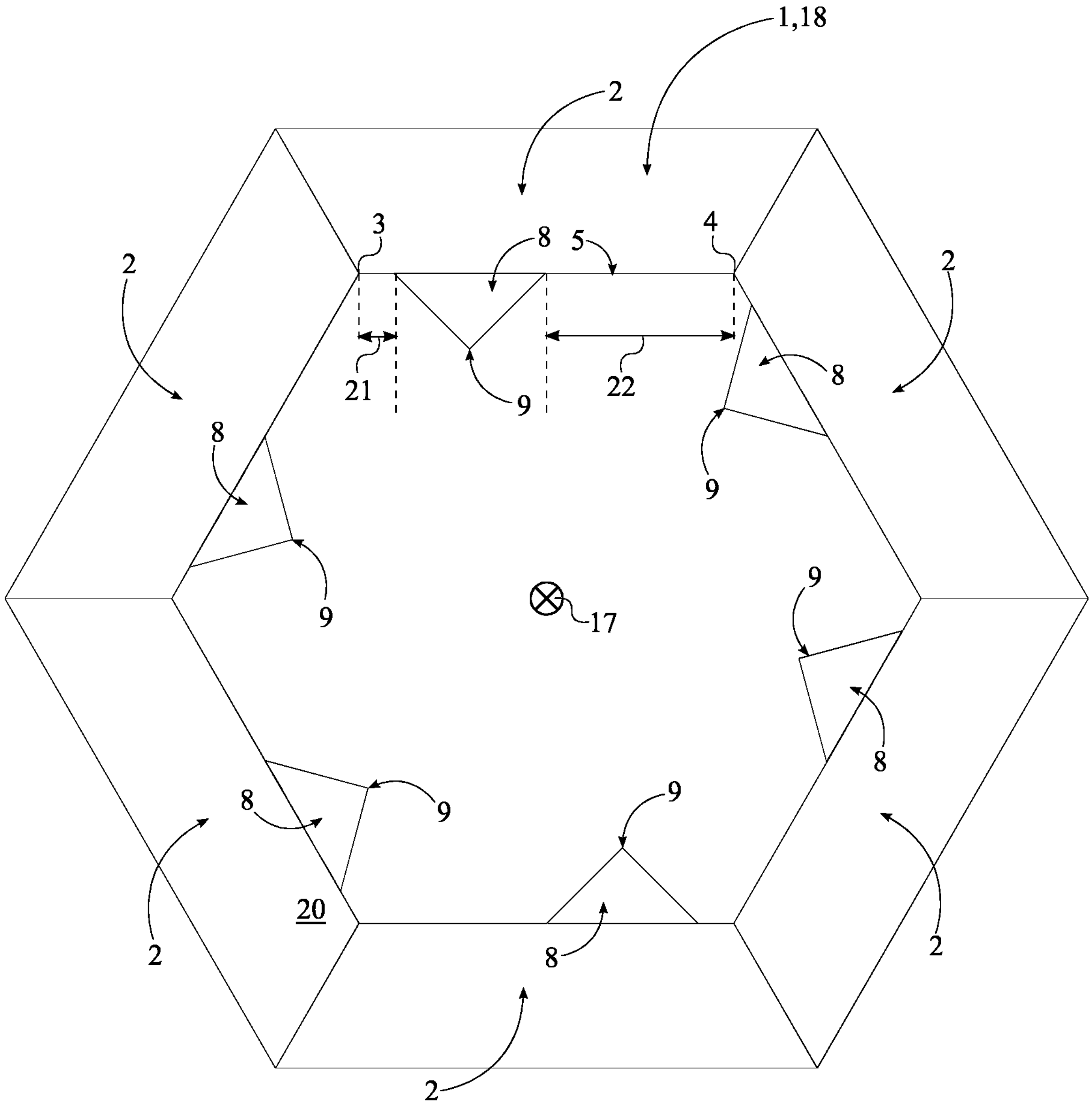
FIG. 14 is a rear view of the separate alternative embodiment of the present invention in relation to FIG. 2, wherein an entire cross-section of the engagement cavity as a triangular profile.

The bracing surface 5 physically presses against the socket fastener, specifically against the lateral sidewall of a head portion from the socket fastener. The first lateral edge 3 and the second lateral edge 4 are positioned opposite to each other across the bracing surface 5. When viewed from either the top perspective or the bottom perspective, the first lateral edge 3 and the second lateral edge 4 from each of the plurality of laterally-bracing sidewalls 2 make up the corners of the screw bit body 1. The engagement cavity 8 extends normal and into the bracing surface 5 and creates an additional gripping point/tooth on the bracing surface 5. In another embodiment, the gripping point is created by the engagement cavity 8 and an adjacent edge, wherein the adjacent edge is either the first lateral edge 3 or the second lateral edge 4; in particular, the adjacent edge is the edge closest to the engagement cavity 8. Additionally, the engagement cavity 8 extends into the screw bit body 1 from the first base 14 towards the second base 15. This ensures that the additional gripping point extends along the length of the screw bit body 1 for maximum grip engagement between the screw bit body 1 and the socket fastener. To further accomplish this, it is preferred that an entire cross-section 9 of the engagement cavity 8 is parallel to the first base 14 and the second base 15. In one embodiment of the present invention, the engagement cavity 8 also tapers from the first base 14 to the second base 15 as seen in FIG. 11. As a consequence of this embodiment, the at least one engagement cavity 8 may taper from the first base 14 to the second base 15 in such a way that the triangular profile adjacent to the first base 14 is larger than the triangular profile adjacent to the second base 15. In this way, the at least one engagement cavity 8 may be appropriately shaped to meet the needs and requirements of the user. Referring to FIG. 3, in one embodiment of the present invention, the entire cross-section 9 of the engagement cavity 8 is a partially-circular profile. Additionally, the partially-circular profile is concave along a direction from the first lateral edge 3 to the second lateral edge 4. The partially-circular profile ensures that there are little to no high stress points in the screw bit body 1, thus increasing the overall longevity of the tool. Referring to FIG. 13 and FIG. 14, in a separate embodiment of the present invention, the entire cross-section 9 of the engagement cavity 8 is a triangular profile. Additionally, the triangular profile is concave along a direction from the first lateral edge 3 to the second lateral edge 4. Alternative profiles may be used for the engagement cavity 8 including, but not limited to, a semi-square profile, a semi-rectangular profile, and a semi-oval profile.

Figure 8:
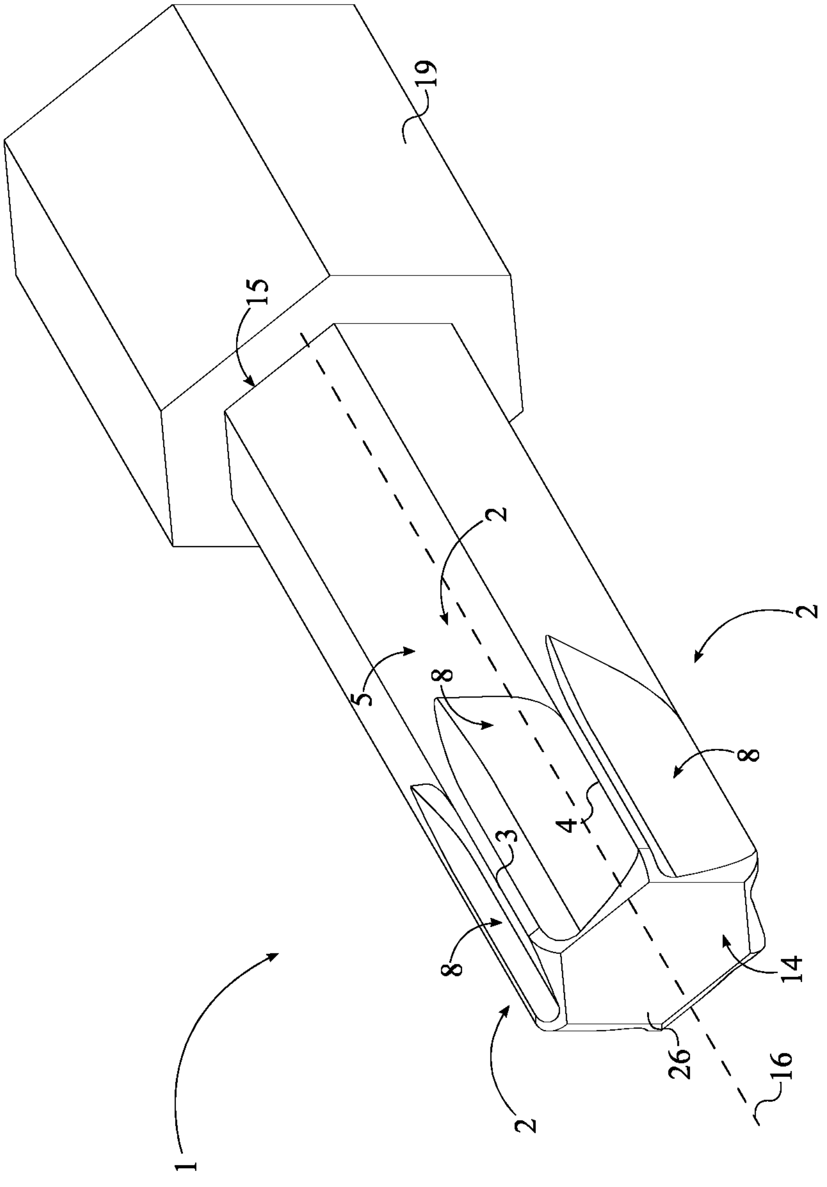
FIG. 8 is a perspective view of an alternative embodiment of the present invention.

In one embodiment of the present invention, referring to FIG. 8 and FIG. 9, the entire cross-section 9 of the engagement cavity 8 comprises a curved portion 10 and a straight portion 11. In this embodiment, the present invention is implemented as an extraction bit, wherein the present invention is designed to extract damaged or broken fasteners, damaged rods, broken studs, and other similar items. The engagement cavity 8 is uniquely shaped in order to form a sharp engagement tooth that grips in the corners of the socket fastener, allowing material from the internal sides of the fastener socket into the engagement cavity 8 and thus yielding a superior grip over traditional tools which are simply designed to push material away. This is especially true for worn or damaged fastener socket. More specifically, the curved portion 10 is a semi-circular curve that is positioned adjacent to the first lateral edge 3. The curved portion 10 is positioned adjacent to the first portion 33, opposite the first lateral edge 3. This arrangement allows the first portion 33 to effectively position the curved portion 10 relative to the first distance 21. The straight portion 11 is positioned adjacent to the curved portion 10. opposite the first portion 33. The straight portion 11 guides a portion of the socket fastener to press against the engagement tooth. As such, the straight portion 11 extends from the curved portion 10 to the second lateral edge 4. Specifically, the straight portion 11 starts at the curved portion 10 and ends at the second lateral edge 4.

In another embodiment of the present invention, referring to FIG. 11, the engagement cavity 8 is centrally positioned on the bracing surface 5. In particular, the engagement cavity 8 is positioned offset from the second lateral edge 4 by a second distance 22. For central positioning, the first distance 21 is equal to the second distance 22, which is shown in FIG. 15. This positions the engagement cavity 8 to engage the internal lateral sidewall of the socket fastener and moves the torqueing stresses to or away from the fastener lateral corners to enhance the gripping function and prevent fastener rounding for the most efficient transfer of torque with the least possibility of slippage. Additionally, this embodiment may be used to rotate the socket fastener in either the clockwise or the counter-clockwise direction.

In another embodiment of the present invention, the proportion between the first distance 21, the second distance 22, and the width of the engagement cavity 8 may be altered in order to achieve a dedicated clockwise or counterclockwise design. In one embodiment, the present invention is configured to be a clockwise drive bit. For this embodiment, the second distance 22 is greater than the first distance 21. In particular, the proportion between the first distance 21, the second distance 22, and the width of the engagement cavity 8 is 1:5:4, thus yielding a design of the present invention which grips and applies torque to the socket fastener in the clockwise direction. This design is used to screw in and secure the socket fastener. In another embodiment, the present invention is configured to be a counter-clockwise screw bit. For this embodiment, the first distance 21 is greater than the second distance 22. In particular, the proportion between the first distance 21, the second distance 22, and the width of the engagement cavity 8 is 5:1:4, thus yielding a design which grips and applies torque to the socket fastener in the counter-clockwise direction. This design is used to release and extract the socket fastener.

Figure 5:
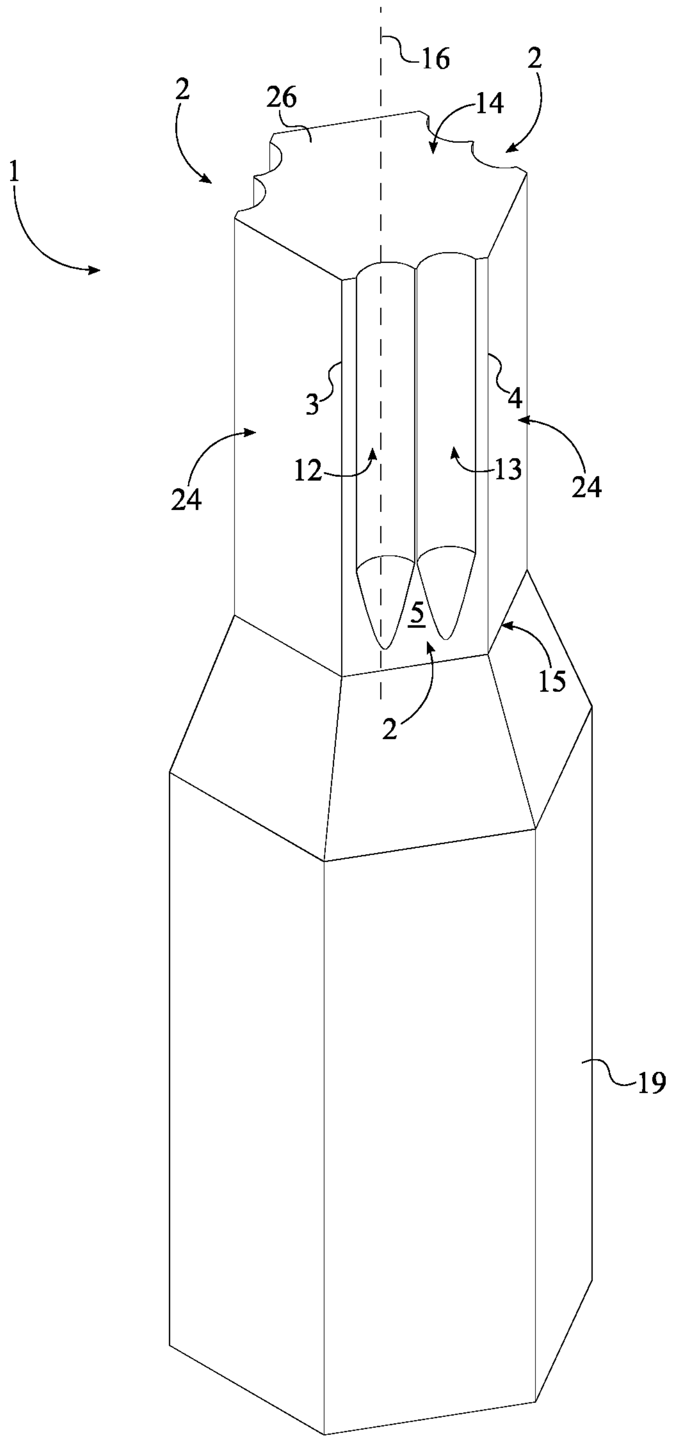
FIG. 5 is a perspective view of an alternative embodiment of the present invention.
Figure 10:
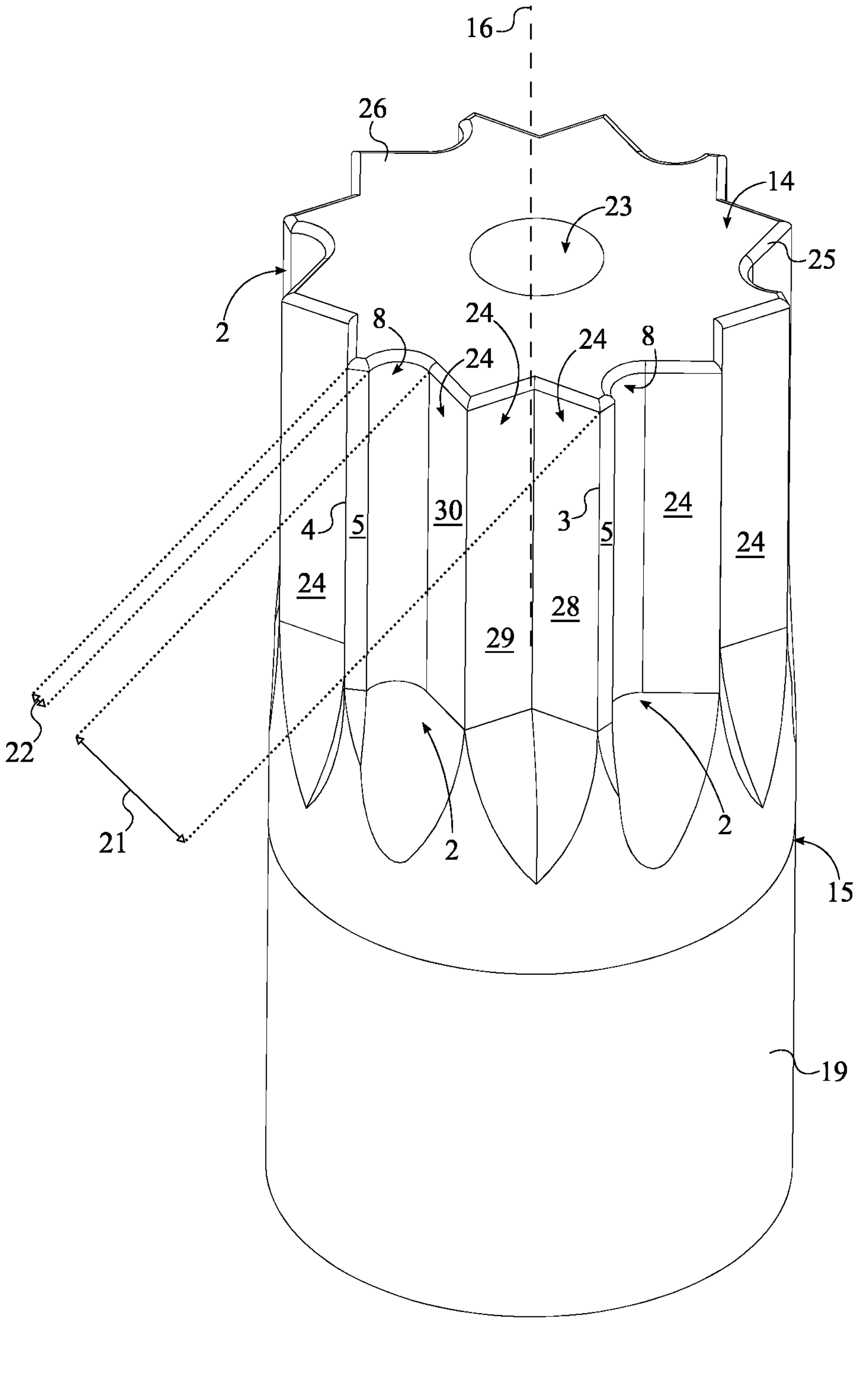
FIG. 10 is a perspective view of an alternative embodiment of the present invention.

Referring to FIG. 5 and FIG. 10, the present invention may also be implemented in a spline/square/other-polygonal bit design. More specifically, if the screw bit body 1 was a spline-type bit body, then the spline-type bit body would be able to transfers torque to the socket fastener through a multitude of protrusions. Thus, the screw bit body 1 may further comprise a plurality of intermittent sidewalls 24. Each of the plurality of intermittent sidewalls 24 is a flat surface which engages the socket fastener like a traditional screw bit design. The plurality of intermittent sidewalls 24 is radially positioned about the rotation axis 16. Additionally, the plurality of intermittent sidewalls 24 is interspersed amongst the plurality of laterally-bracing sidewalls 2. The ratio between the plurality of laterally-bracing sidewalls 2 and the plurality of intermittent sidewalls 24 is subject to change to yield a variety of different screw bit designs. In one embodiment, the plurality of intermittent sidewalls 24 and the plurality of laterally-bracing sidewalls 2 radially alternate between each other. In another embodiment, there are three sidewalls from the plurality of intermittent sidewalls 24 in between each of the plurality of laterally-bracing sidewalls 2. Resultantly, this configuration places an engagement feature/tooth at every other protrusion of the screw bit body 1.

In an exemplary embodiment, a first intermittent sidewall 28, a second intermittent sidewall 29, and a third intermittent sidewall 30 among the plurality of intermittent sidewalls 24 are interspersed on a corresponding laterally-bracing sidewall among the plurality of laterally-bracing sidewalls 2, as represented in FIG. 10. The first intermittent sidewall 28, second intermittent sidewall 29, and third intermittent sidewall 30 enable effective connection with a fastener while providing the desired space that prevents mechanical wear and fatigue on parts. The first intermittent sidewall 28 and the second intermittent sidewall 29 are perpendicularly positioned to each other. This arrangement results in a 90-degree angle, which may be optimal for certain applications. The third intermittent sidewall 30 is located in between the at least one engagement cavity 8 of the corresponding laterally-bracing sidewall and the second intermittent sidewall 29. Thus, the third intermittent sidewall 30 provides structural support for the at least one engagement cavity 8 during preferred usage of the present invention.

Figure 6:
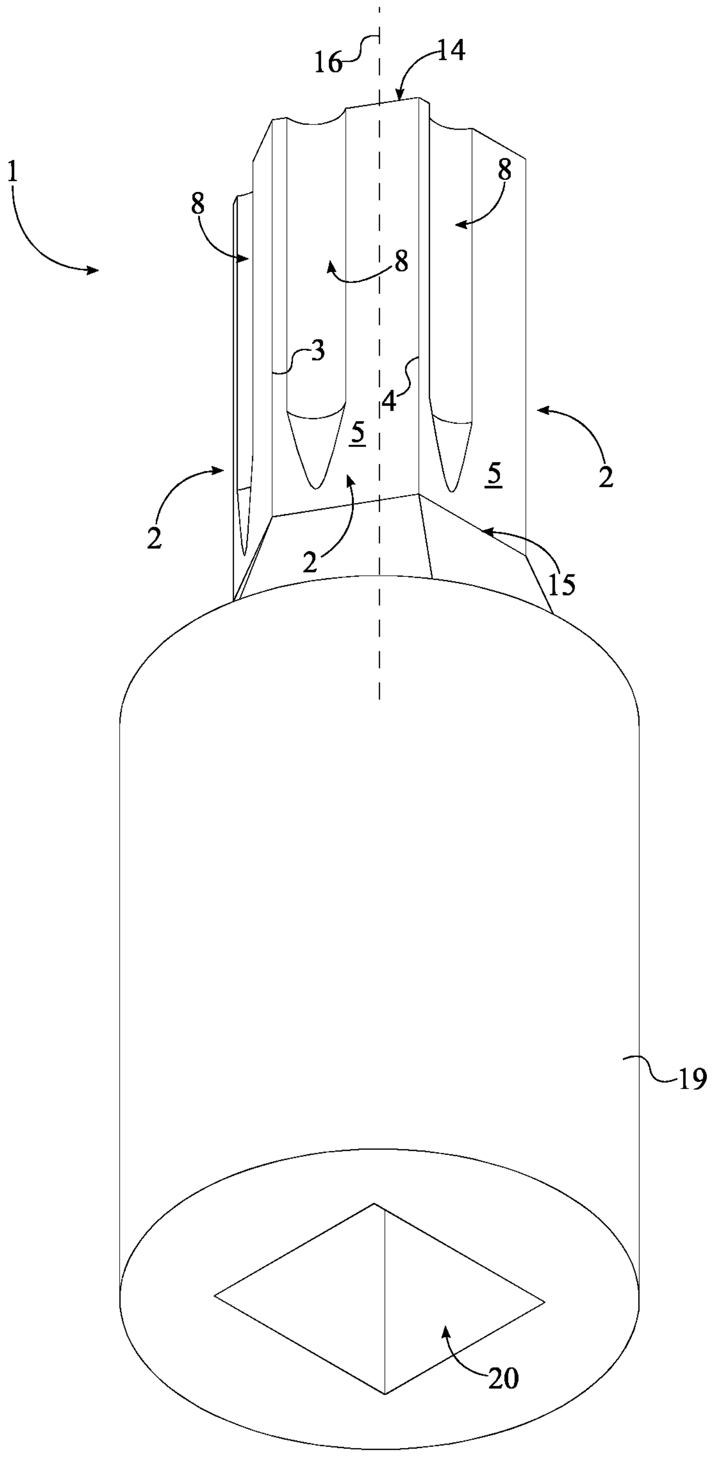
FIG. 6 is a bottom perspective of the present invention.

In another embodiment, referring to FIG. 6, the present invention further comprises an engagement bore 20. The engagement bore 20 allows the present invention to be attached to a male attachment member of an external torque tool, such as a socket wrench or a screw driver. The engagement bore 20 extends into the attachment body 19 along the rotation axis, opposite the screw bit body 1. The engagement bore 20 is shaped to receive a male attachment member of a socket wrench; the preferred shape is square as the majority of socket wrenches utilize a square attachment member. In this embodiment, the preferred attachment body 19 is cylindrical shaped. In alternative embodiments, the shape and design of the engagement bore 20 and the attachment body 19 may vary to be adaptable to different torque tool designs and different attachment means.

Figure 2:
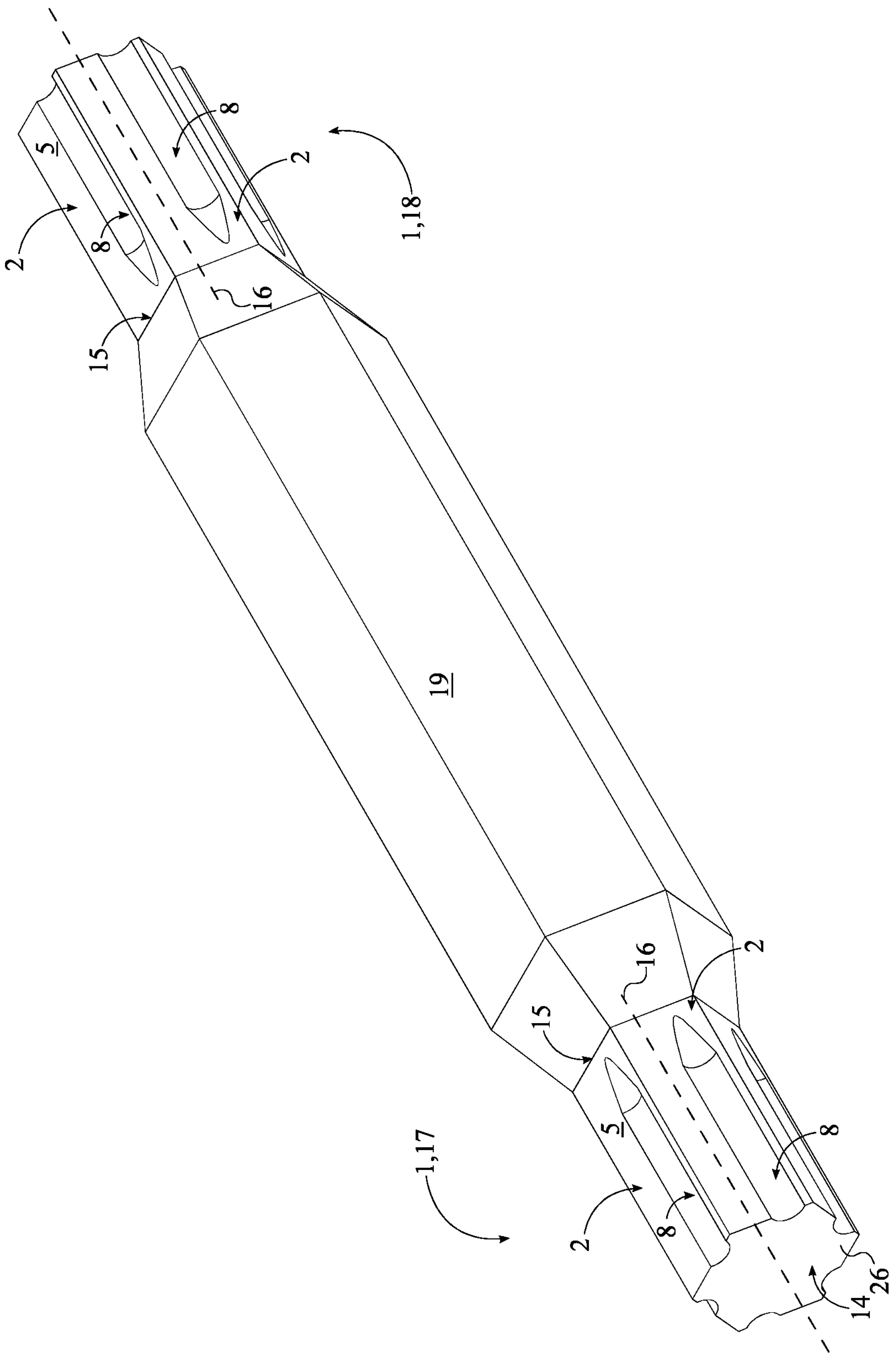
FIG. 2 is a perspective view of an alternative embodiment of the present invention.

In one embodiment, referring to FIG. 2, the present invention is implemented as a dual sided screw bit, thus providing both a clockwise and a counter-clockwise configuration simultaneously in a single tool. In this embodiment, the at least one screw bit body 1 comprises a first screw bit body 17 and a second screw bit body 18. The attachment body 19 preferably has a hexagonal cross-section. The attachment body 19 is centrally positioned around and along the rotation axis 16 of the first screw bit body 17 such that the rotation axis of the attachment body 19 and the rotation axis 16 of the first screw bit body 17 are coincidentally aligned. Additionally, the attachment body 19 is connected adjacent to the second base 15 of the first screw bit body 17. The second screw bit body 18 shares the attachment body 19 with the first screw bit body 17. Thus, the second screw bit body 18 is concentrically positioned with the first screw bit body 17. Additionally, the second screw bit body 18 is positioned adjacent to the attachment body 19, opposite the first screw bit body 17, similar to traditional double-sided screw bit designs. Similar to the first screw bit body 17, the attachment body 19 is connected to the second base 15 of the second screw bit body 18. The first screw bit body 17 is designed to screw in a socket fastener, the clockwise configuration. For this, referring to FIG. 3, the second distance 22 of the first screw bit body 17 is greater than the first distance 21 of the first screw bit body 17. This positions the additional gripping point of the first screw bit body 17 adjacent to the first lateral edge 3 of the first screw bit body 17. The second screw bit body 18 is designed to unscrew/extract the socket fastener, i.e. the counter-clockwise configuration. Referring to FIG. 4, the first distance 21 of the second screw bit body 18 is greater than the second distance 22 of the second screw bit body 18. This positions the additional gripping point of the second screw bit body 18 adjacent to the second lateral edge 4 of the second screw bit body 18.

In another embodiment of the present invention, referring to FIG. 5, the at least one engagement cavity 8 comprises a first cavity 12 and a second cavity 13. This embodiment is an alternative configuration which yields a clockwise and counter-clockwise configuration. In particular, the first cavity 12 and the second cavity 13 are oriented parallel and offset to each other. The first cavity 12 is positioned adjacent and offset to the first lateral edge 3 and the second cavity 13 is positioned adjacent and offset to the second lateral edge 4. This allows the user to rotate the present invention either in the clockwise or counter-clockwise rotation without removing the present invention from the torque tool while still taking advantage of the additional gripping point(s). In this embodiment, it is preferred that the present invention further comprises the plurality of intermittent sidewalls 24, wherein the plurality of intermittent sidewalls 24 is interspersed amongst the plurality of laterally-bracing sidewalls 2. As a consequence of this embodiment, the triangular profile may be a plurality of triangular profiles arranged along the plurality of laterally-bracing sidewalls 2. Such an embodiment enables enhanced adaptation to various high-stress uses of the present invention.

Figure 7:
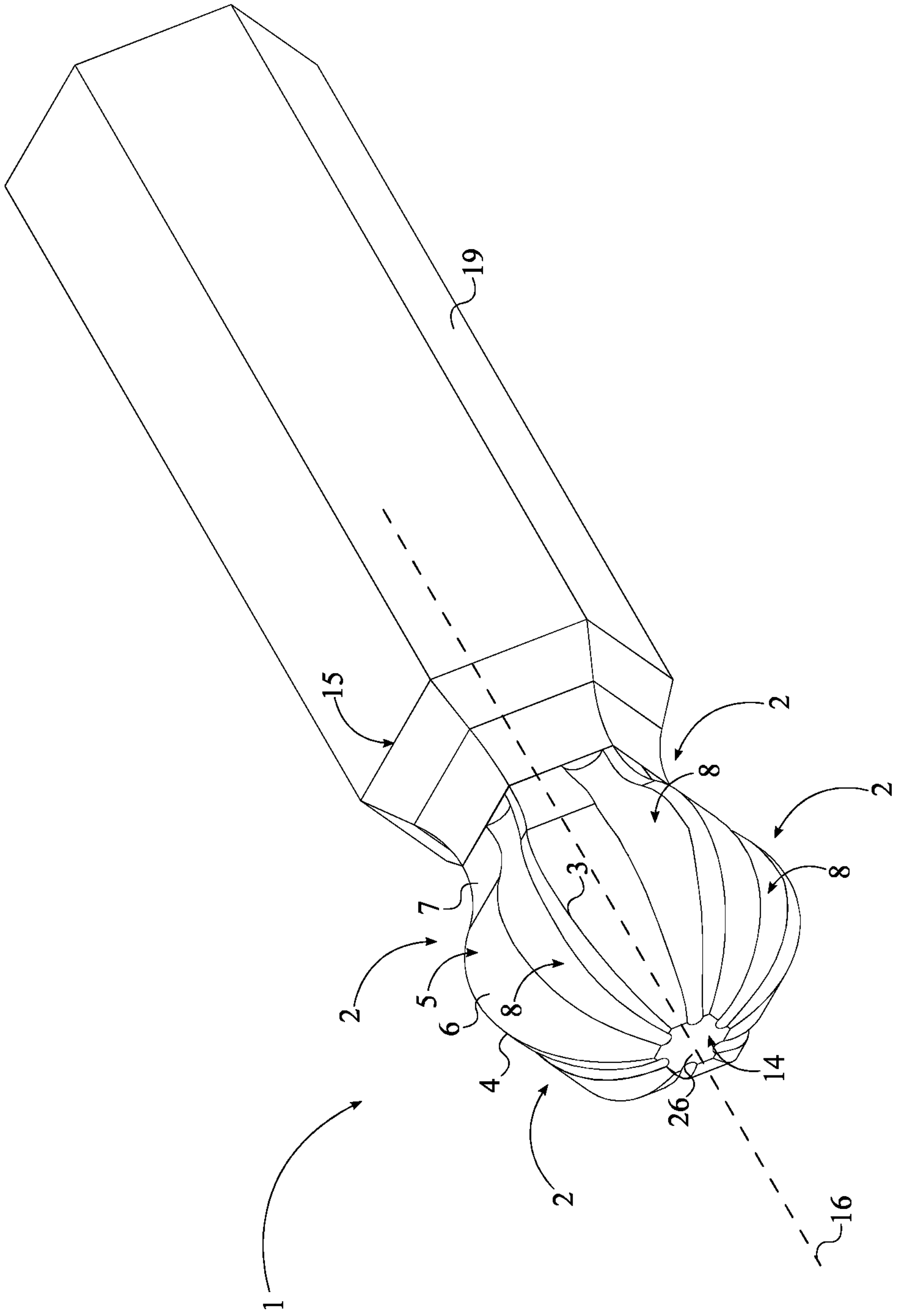
FIG. 7 is a perspective view of an alternative embodiment of the present invention.

Referring to FIG. 7, in an alternative embodiment, the present invention is implemented as a ball-end screw bit. In this embodiment, the bracing surface 5 for each of the plurality of laterally-bracing sidewalls 2 comprises a convex portion 6 and a concave portion 7. The convex portion 6 and the concave portion 7 delineate a curved surface such that, overall, the plurality of laterally-bracing sidewalls 2 forms a ball-like shape. The convex portion 6 is positioned adjacent to the first base 14 such that the convex portion 6 from each of the plurality of laterally-bracing sidewalls 2 forms the body of the ball-like shape. The concave portion 7 is positioned adjacent to the convex portion 6, opposite to the first base 14 such that the concave portion 7 from each of the plurality of laterally-bracing sidewalls 2 further forms the ball-like shape and provides clearance for when the screw bit body 1 is engaged to the socket fastener at an angle. The convex portion 6 and the concave portion 7 are oriented along the rotation axis 16 of the screw bit body 1, and thus the length of the screw bit body 1, to position the ball-like shaped terminally on the screw bit body 1. It is preferred that the curvature, length, and height of the concave portion 7 and the convex portion 6 is identical. Additionally, it is preferred that the engagement cavity 8 extends along the whole length of the convex portion 6 and the concave portion 7. Thus, additional gripping is provided along the screw bit body 1, regardless of the angle between the socket fastener and the screw bit body 1.

Referring to FIG. 10, in one embodiment, the present invention is implemented as a tamper-resistant screw bit. In particular, the present invention further comprises a pin-in security hole 23 which interlocks with a complimentary post within a unique socket fastener. Thus, a set of unique socket fasteners and a unique-key screw bit may be sold, utilized, or manufactured to ensure tamper proof design. This type of interlocking design is used for security reasons, preventing unauthorized personnel from accessing certain socket fasteners. The pin-in security hole 23 is concentrically positioned with the rotation axis 16 of the screw bit body 1. Additionally, the pin-in security hole 23 extends into the screw bit body 1 from the first base 14. The size, depth, and profile of the pin-in security is subject to change to meet the needs and specifications of the user.

Figure 12:
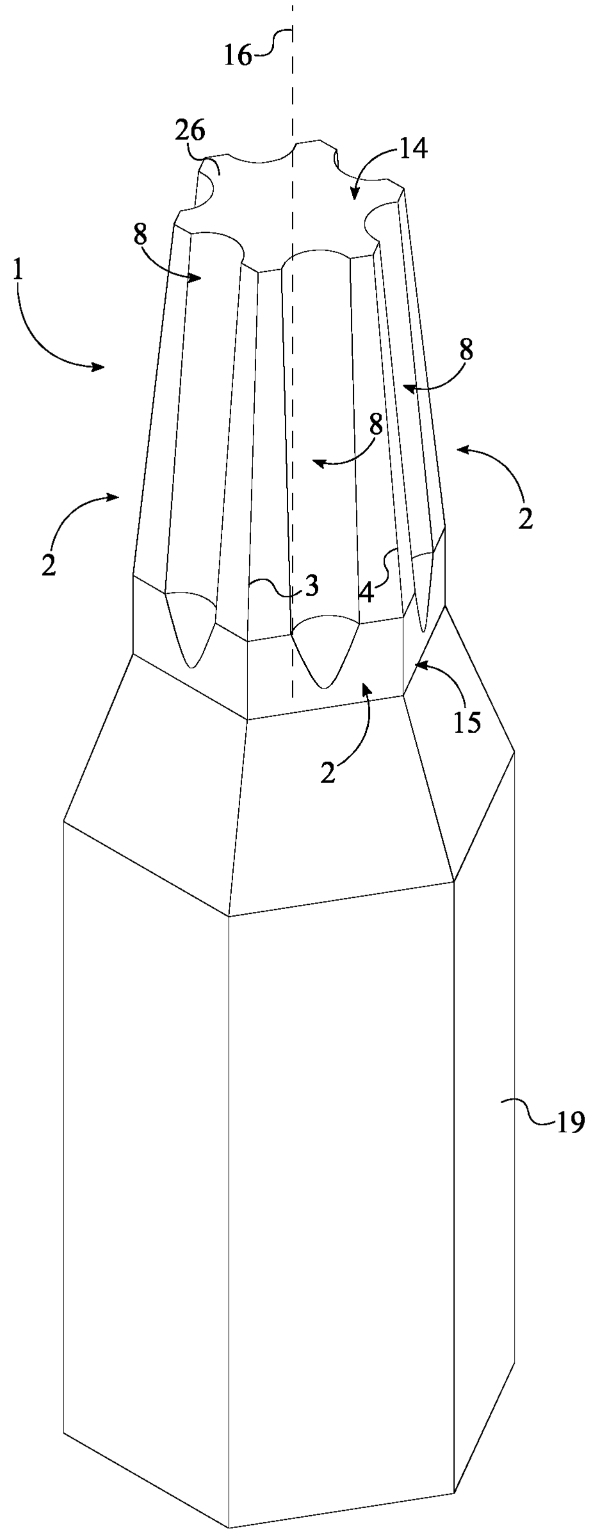
FIG. 12 is a perspective view of an alternative embodiment of the present invention.

In one embodiment, referring to FIG. 11, the present invention includes additional features in order to guide the screw bit body 1 into the socket fastener. In particular, a lateral edge 25 between the first base 14 and each of the plurality of laterally-bracing sidewalls 2 is chamfered which aids the user in interlocking the screw bit body 1 within the socket fastener. Referring to FIG. 12, in another embodiment, the present invention is implemented in a screwdriver design. In this embodiment, the screw bit body 1 is tapered from the second base 15 towards the first base 14, similar to traditional screwdrivers. The degree of tapering is subject to change to meet the needs and requirements of the user.

In other embodiments, the present invention may be implemented in the form of a socket for tightening or loosening of bolts and other similar fasteners. For this, the screw bit body 1 is implemented as a cavity traversing into a cylinder, similar to traditional socket designs.

Although the invention has been explained in relation to its preferred embodiment, it is to be understood that many other possible modifications and variations can be made without departing from the spirit and scope of the invention as hereinafter claimed.

What is claimed is:

1. An advanced holding apparatus comprising:
at least one screw bit body;
an attachment body;
the at least one screw bit body comprising a plurality of laterally-bracing sidewalls, a first base, and a second base;
each of the plurality of laterally-bracing sidewalls comprising a first lateral edge, a second lateral edge, a bracing surface, and at least one engagement cavity;
the plurality of laterally-bracing sidewalls being radially positioned about a rotation axis of the at least one screw bit body;
the first base being flat and oriented perpendicular to the bracing surface of each of the plurality of laterally-bracing sidewalls;
the first lateral edge and the second lateral edge being positioned opposite to each other across the bracing surface;
the at least one engagement cavity extending normal and into the bracing surface;
the at least one engagement cavity extending into the at least one screw bit body from the first base towards the second base;
the at least one engagement cavity being positioned offset from the first lateral edge by a first distance;
the at least one engagement cavity being positioned offset from the second lateral edge by a second distance;
the first distance being equal to the second distance;
an entire cross-section of the at least one engagement cavity being parallel to the first base and the second base;
the entire cross-section of the at least one engagement cavity being a triangular profile;
the triangular profile comprising a plurality of vertexes and a pair of elongated portions;
the pair of elongated portions being interspersed amongst the plurality of vertexes;
each of the pair of elongated portions being a shape selected from the group consisting of: concave and convex;
the attachment body being centrally positioned around and along the rotation axis; and
the attachment body being connected adjacent to the second base.

2. The advanced holding apparatus as claimed in claim 1 comprising:
the at least one screw bit body further comprising a plurality of intermittent sidewalls;
the plurality of intermittent sidewalls each being a flat surface;
the plurality of intermittent sidewalls being radially positioned about the rotation axis; and
the plurality of intermittent sidewalls being interspersed amongst the plurality of laterally-bracing sidewalls.

3. The advanced holding apparatus as claimed in claim 1 comprising:
the first base comprising a first base surface;
the first base surface and the bracing surface each being flat; and
the first base surface and the bracing surface being oriented perpendicular to each other.

* * * * *